United States Patent
Chen et al.

(10) Patent No.: US 10,461,832 B2
(45) Date of Patent: Oct. 29, 2019

(54) CHANNEL STATUS INFORMATION FEEDBACK AND CONTROL METHOD AND DEVICE

(71) Applicant: China Academy of Telecommunications Technology, Beijing (CN)

(72) Inventors: Wenhong Chen, Beijing (CN); Qiubin Gao, Beijing (CN); Hui Li, Beijing (CN); Tamrakar Rakesh, Beijing (CN); Runhua Chen, Beijing (CN)

(*) Notice: Subject to any disclaimer, the term of this patent is extended or adjusted under 35 U.S.C. 154(b) by 0 days.

(21) Appl. No.: 15/745,122

(22) PCT Filed: Jul. 19, 2016

(86) PCT No.: PCT/CN2016/090522
§ 371 (c)(1),
(2) Date: Jan. 15, 2018

(87) PCT Pub. No.: WO2017/012535
PCT Pub. Date: Jan. 26, 2017

(65) Prior Publication Data
US 2018/0205439 A1 Jul. 19, 2018

(30) Foreign Application Priority Data
Jul. 20, 2015 (CN) .......................... 2015 1 0429049

(51) Int. Cl.
*H04B 7/06* (2006.01)
*H04B 7/04* (2017.01)
(Continued)

(52) U.S. Cl.
CPC ............. *H04B 7/0626* (2013.01); *H04B 7/04* (2013.01); *H04B 7/0643* (2013.01);
(Continued)

(58) Field of Classification Search
CPC ...... H04B 7/04; H04B 7/0643; H04B 7/0626; H04B 7/06; H04W 72/0446; H04W 24/10; H04W 72/0413; H04W 72/04
(Continued)

(56) References Cited

U.S. PATENT DOCUMENTS 8,929,235 B2 * 1/2015 Baldemair ............ H04W 24/10
370/252
9,414,249 B2 * 8/2016 Hooli .................... H04L 1/0027
(Continued)

FOREIGN PATENT DOCUMENTS

CN 101931989 A 12/2010
CN 102291224 A 12/2011
(Continued)

*Primary Examiner* — Man U Phan
(74) *Attorney, Agent, or Firm* — Kilpatrick Townsend & Stockton, LLP

(57) ABSTRACT

Disclosed are a channel status information (CSI) feedback and control method and device. The method comprises: a terminal receives trigger signaling sent by a base station, the trigger signaling being used for instructing the terminal to report CSI obtained within a specified measurement window; and the terminal reports the CSI that is measured by the terminal within the specified measurement window to the base station. Because a terminal reports only CSI that is measured by the terminal within a specified measurement window, the frequency of feeding back CSI by the terminal is reduced, and CSI feedback overheads are also reduced.

14 Claims, 5 Drawing Sheets

S41
A user equipment receives a trigger signaling transmitted by a base station, where the trigger signaling is configured to indicate the user equipment to report CSI measured in a specified measurement window S42
The user equipment reports the CSI measured by the user equipment in the specified measurement window to the base station

(51) Int. Cl.
*H04W 24/10* (2009.01)
*H04W 72/04* (2009.01)

(52) U.S. Cl.
CPC ....... *H04W 24/10* (2013.01); *H04W 72/0413* (2013.01); *H04W 72/0446* (2013.01)

(58) Field of Classification Search
USPC .................................................. 370/252, 329
See application file for complete search history.

(56) References Cited

U.S. PATENT DOCUMENTS

| | | | | |
|---|---|---|---|---|
| 9,591,506 | B2* | 3/2017 | Chen | H04W 24/10 |
| 9,667,331 | B2* | 5/2017 | Wei | H04W 24/10 |
| 9,749,111 | B2* | 8/2017 | Hammarwall | H04L 5/0057 |
| 9,749,991 | B2* | 8/2017 | Guo | H04W 72/0413 |
| 9,912,430 | B2* | 3/2018 | Sayana | H04J 3/1694 |
| 9,979,526 | B2* | 5/2018 | Li | H04W 72/08 |
| 10,085,164 | B2* | 9/2018 | Chen | H04W 24/10 |
| 10,085,166 | B2* | 9/2018 | Li | H04W 24/10 |
| 10,122,481 | B2* | 11/2018 | Seo | H04B 7/0626 |
| 2011/0249584 | A1 | 10/2011 | Barbieri et al. | |
| 2011/0305161 | A1* | 12/2011 | Ekpenyong | H04L 1/0031 370/252 |
| 2012/0076017 | A1* | 3/2012 | Luo | H04L 1/0026 370/252 |
| 2013/0121174 | A1* | 5/2013 | Koivisto | H04B 7/0636 370/252 |
| 2013/0294351 | A1* | 11/2013 | Kwon | H04W 24/10 370/328 |
| 2013/0322376 | A1* | 12/2013 | Marinier | H04W 72/06 370/329 |
| 2013/0336214 | A1* | 12/2013 | Sayana | H04B 7/024 370/328 |
| 2014/0301231 | A1 | 10/2014 | Hooli et al. | |
| 2015/0071187 | A1* | 3/2015 | Chen | H04L 1/0026 370/329 |
| 2015/0146557 | A1* | 5/2015 | Pan | H04L 5/0051 370/252 |
| 2015/0358139 | A1* | 12/2015 | Li | H04W 72/08 370/252 |

FOREIGN PATENT DOCUMENTS

| | | |
|---|---|---|
| CN | 102291764 A | 12/2011 |
| CN | 102368697 A | 3/2012 |
| CN | 102845010 A | 12/2012 |
| CN | 103891377 A | 6/2014 |
| CN | 104380649 A | 2/2015 |
| GB | 2496451 A | 5/2013 |
| WO | 2013/169197 A1 | 11/2013 |

* cited by examiner

CHANNEL STATUS INFORMATION FEEDBACK AND CONTROL METHOD AND DEVICE

This application is a US National Stage of International Application No. PCT/CN2016/090522, filed on Jul. 19, 2016, designating the United States and claiming priority to Chinese Patent Application No. 201510429049.3, filed with the Chinese Patent Office on Jul. 20, 2015 and entitled "A method and device for feeding back channel state information, and a method and device for controlling feedback of channel state information", the content of which is hereby incorporated by reference in its entirety.

FIELD

The present invention relates to the field of communications, and particularly to a method and device for feeding back channel state information, and a method and device for controlling feedback of channel state information.

BACKGROUND

In the existing cellular system, an array of antennas in a base station is typically arranged horizontally as illustrated in FIG. 1A and FIG. 1B. A beam of a transmitter in the base station can only be adjusted in the horizontal direction. With the development of the antenna technologies, an array of active antennas in which each antenna array element can be controlled separately has emerged in the industry as illustrated in FIG. 2A and FIG. 2B. With this array of antennas, it becomes possible to dynamically adjust the beam in the vertical direction.

In this three-dimension array of antennas, a signal transmitted by the base station can be used for beam-forming on a User Equipment (UE) in both the horizontal direction and the vertical direction. In order to obtain channel state information after beam-forming in the two dimensions, the base station typically performs beam-forming in the vertical dimension on a Channel State Information Reference Signal (CSI-RS) (as illustrated in FIG. 3), so that the UE feeds back Channel State Information (CSI) based upon the vertically beam-formed CSI-RS. In this way, the base station can pre-code data in the two dimensions including the vertical and horizontal dimensions, and perform link adaption, using a beam-forming vector in the vertical dimension for the CSI-RS, and the CSI fed back by the UE.

In a Full Dimension Multiple Input Multiple Output (FD MIMO) system, a cell may be configured with a plurality of CSI-RS resources, and different beam-forming vectors in the vertical dimension are applied to different resources. Since the CSI-RS is currently transmitted periodically, the UE needs to measure the CSI-RS in each period, and in order to feed back CSI periodically, the UE needs to report the CSI periodically, thus resulting in a high feedback frequency and a significant feedback overhead, which may degrade the spectrum efficiency.

SUMMARY

Embodiments of the invention provide a method and device for feeding back channel state information, and a method and device for controlling feedback of channel state information so as to address the problems of a high feedback frequency and a significant feedback overhead, which may degrade the spectrum efficiency.

An embodiment of the invention provides a method for feeding back channel state information, the method including: receiving, by a user equipment, a trigger signaling transmitted by a base station, wherein the trigger signaling is configured to indicate the user equipment to report Channel State Information (CSI) obtained in a specified measurement window; and reporting, by the user equipment, the CSI measured by the user equipment in the measurement window to the base station.

Optionally the length of the measurement window is predefined; or the length of the measurement window is informed by the base station to the user equipment via higher-layer signaling; or the trigger signaling includes information about the length of the measurement window, wherein the information about the length of the measurement window is the length of the measurement window, or is indication information indicating that the length of the measurement window is a predefined fixed length or a length indicated in higher-layer signaling.

Optionally the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, wherein N is the number of consecutive sub-frames between a sub-frame in which the user equipment receives the trigger signaling and a sub-frame in which the user equipment reports the CSI.

Further to any one of the embodiments above, in an optional implementation, reporting, by the user equipment, the CSI measured in the measurement window to the base station includes: reporting, by the user equipment, CSI measured by the user equipment in a first measurement window to the base station after M sub-frames elapse since the trigger signaling is received, wherein the first measurement window is a measurement window before the trigger signaling is received and closest to a sub-frame in which the trigger signaling is received, and M is an integer more than or equal to 0.

Optionally the user equipment reports the CSI measured in the first measurement window to the base station over the latest Physical Uplink Control Channel (PUCCH) resource after M sub-frames elapse since the trigger signaling is received; or the user equipment reports the CSI measured in the first measurement window to the base station over a Physical Uplink Shared Channel (PUSCH) resource in the M-th sub-frame after the trigger signaling is received.

In another optional implementation, reporting, by the user equipment, the CSI measured by the user equipment in the measurement window to the base station includes: reporting, by the user equipment, CSI measured by the user equipment in a second measurement window to the base station after M sub-frames elapse following the end of the second measurement window, wherein the second measurement window is a specified measurement window after the trigger signaling is received and closest to a sub-frame in which the trigger signaling is received, and M is an integer more than or equal to 0; or reporting, by the user equipment, CSI measured by the user equipment by the receiving module in a second measurement window to the base station after M sub-frames elapse since the trigger signaling is received, wherein the second measurement window is a specified measurement window after the trigger signaling is received and closest to a sub-frame in which the trigger signaling is received, and M is an integer more than or equal to 0.

Optionally the user equipment reports the CSI measured by the user equipment in the second measurement window to the base station over the latest PUCCH resource after M sub-frames elapse following the end of the second measurement window; or the user equipment reports the CSI measured by the user equipment in the second measurement window to the base station over a PUSCH resource in the M-th sub-frame following the end of the second measurement window; or the user equipment reports the CSI measured by the user equipment in the second measurement window to the base station over the latest PUCCH resource after M sub-frames elapse since the trigger signaling is received; or the user equipment reports the CSI measured by the user equipment in the second measurement window to the base station over a PUSCH resource in the M-th sub-frame after the trigger signaling is received.

Further to any one of the embodiments above, the trigger signaling includes configuration information indicating downlink reference signals corresponding to CSI measurement by the user equipment, or indication information of a set of configuration information of downlink reference signals corresponding to CSI measurement by the user equipment.

An embodiment of the invention provides a method for controlling feedback of channel state information, the method including: transmitting, by a base station, a trigger signaling to a user equipment to indicate the user equipment to report Chanel State Information (CSI) measured in a specified measurement window; and receiving, by the base station, the CSI, reported by the user equipment, measured in the measurement window.

Optionally the length of the measurement window is predefined; or the length of the measurement window is informed by the base station to the user equipment via higher-layer signaling; or the trigger signaling includes information about the length of the measurement window, wherein the information about the length of the measurement window is the length of the measurement window, or is indication information indicating that the length of the measurement window is a predefined fixed length or a length indicated in higher-layer signaling.

Optionally the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, wherein N is the number of consecutive sub-frames between a sub-frame in which the base station transmits the trigger signaling and a sub-frame in which the base station receives the CSI reported by the user equipment.

Further to any one of the embodiments above, in an optional implementation, receiving, by the base station, the CSI, reported by the user equipment, measured in the measurement window includes: receiving, by the base station, CSI, reported by the user equipment, measured in a first measurement window after M sub-frames elapse since the trigger signaling is transmitted, wherein the first measurement window is a specified measurement window before the trigger signaling is transmitted and closest to a sub-frame in which the trigger signaling is transmitted, and M is an integer more than or equal to 0.

Optionally the base station receives the CSI, reported by the user equipment, measured in the first measurement window over the latest PUCCH resource after M sub-frames elapse since the trigger signaling is transmitted; or the base station receives the CSI, reported by the user equipment, measured in the first measurement window over a PUSCH resource in the M-th sub-frame after the trigger signaling is transmitted.

In another optional implementation, receiving, by the base station, the CSI, reported by the user equipment, measured in the measurement window includes: receiving, by the base station, CSI, reported by the user equipment, measured in a second measurement window after M sub-frames elapse following the end of the second measurement window, wherein the second measurement window is a specified measurement window after the trigger signaling is transmitted and closest to a sub-frame in which the trigger signaling is transmitted, and M is an integer more than or equal to 0; or receiving, by the base station, CSI, reported by the user equipment, measured in a second measurement window after M sub-frames elapse since the trigger signaling is transmitted, wherein the second measurement window is a specified measurement window after the trigger signaling is transmitted and closest to a sub-frame in which the trigger signaling is transmitted, and M is an integer more than or equal to 0.

Optionally the base station receives the CSI, reported by the user equipment, measured in the second measurement window over the latest PUCCH resource after M sub-frames elapse following the end of the second measurement window; or the base station receives the CSI, reported by the user equipment, measured in the second measurement window over a PUSCH resource in the M-th sub-frame following the end of the second measurement window; or the base station receives the CSI, reported by the user equipment, measured in the second measurement window over the latest PUCCH resource after M sub-frames elapse since the trigger signaling is transmitted; or the base station receives the CSI, reported by the user equipment, measured in the second measurement window over a PUSCH resource in the M-th sub-frame after the trigger signaling is transmitted.

Further to any one of the embodiments above, the trigger signaling includes configuration information indicating downlink reference signals corresponding to CSI measurement by the user equipment, or indication information of a set of configuration information of downlink reference signals corresponding to CSI measurement by the user equipment.

An embodiment of the invention provides a device for feeding back channel state information, the device including: a receiving module configured to receive a trigger signaling transmitted by a base station, wherein the trigger signaling is configured to indicate the device to report Channel State Information (CSI) obtained in a specified measurement window; and a processing module configured to report the CSI measured by the processing module in the measurement window to the base station.

Optionally the length of the measurement window is predefined; or the length of the measurement window is informed by the base station to the device via higher-layer signaling; or the trigger signaling includes information about the length of the measurement window, wherein the information about the length of the measurement window is the length of the measurement window, or is indication information indicating that the length of the measurement window is a predefined fixed length or a length indicated in higher-layer signaling.

Optionally the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, wherein N is the number of consecutive sub-frames between a sub-frame in which the trigger signaling is received and a sub-frame in which the CSI is reported.

Further to any one of the embodiments above, in an optional implementation, the processing module is configured: to report CSI measured by the processing module in a first measurement window to the base station after M sub-frames elapse since the receiving module receives the trigger signaling, wherein the first measurement window is a measurement window before the trigger signaling is received and closest to a sub-frame in which the trigger signaling is received, and M is an integer more than or equal to 0.

Optionally the processing module is configured: to report the CSI measured by the processing module in the first measurement window to the base station over the latest PUCCH resource after M sub-frames elapse since the receiving module receives the trigger signaling; or to report the CSI measured by the processing module in the first measurement window to the base station over a PUSCH resource in the M-th sub-frame after the receiving module receives the trigger signaling.

In another optional implementation, the processing module is configured: to report CSI measured by the processing module in a second measurement window to the base station after M sub-frames elapse following the end of the second measurement window, wherein the second measurement window is a specified measurement window after the trigger signaling is received and closest to a sub-frame in which the trigger signaling is received, and M is an integer more than or equal to 0; or to report CSI measured by the processing module by the receiving module in a second measurement window to the base station after M sub-frames elapse since the receiving module receives the trigger signaling, wherein the second measurement window is a specified measurement window after the trigger signaling is received and closest to a sub-frame in which the trigger signaling is received, and M is an integer more than or equal to 0.

Optionally the processing module is configured: to report the CSI measured by the processing module in the second measurement window to the base station over the latest PUCCH resource after M sub-frames elapse following the end of the second measurement window; or to report the CSI measured by the processing module in the second measurement window to the base station over a PUSCH resource in the M-th sub-frame following the end of the second measurement window; or to report the CSI measured by the processing module in the second measurement window to the base station over the latest PUCCH resource after M sub-frames elapse since the receiving module receives the trigger signaling; or to report the CSI measured by the processing module in the second measurement window to the base station over a PUSCH resource in the M-th sub-frame after the receiving module receives the trigger signaling.

An embodiment of the invention provides a device for controlling feedback of channel state information, the device including: a transmitting module configured to transmit a trigger signaling to a user equipment to indicate the user equipment to report Chanel State Information (CSI) measured in a specified measurement window; and a receiving module configured to receive the CSI, reported by the user equipment, measured in the measurement window.

Optionally the length of the measurement window is predefined; or the length of the measurement window is informed by the device to the user equipment via higher-layer signaling; or the trigger signaling includes information about the length of the measurement window, wherein the information about the length of the measurement window is the length of the measurement window, or is indication information indicating that the length of the measurement window is a predefined fixed length or a length indicated in higher-layer signaling.

Optionally the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, wherein N is the number of consecutive sub-frames between a sub-frame in which the trigger signaling is received and a sub-frame in which the CSI is reported.

Further to any one of the embodiments above, in an optional implementation, the receiving module is configured: to receive CSI, reported by the user equipment, measured in a first measurement window after M sub-frames elapse since the transmitting module transmits the trigger signaling, wherein the first measurement window is a measurement window before the trigger signaling is transmitted and closest to a sub-frame in which the trigger signaling is transmitted, and M is an integer more than or equal to 0.

Optionally the receiving module is configured: to receive the CSI, reported by the user equipment, measured in the first measurement window over the latest PUCCH resource after M sub-frames elapse since the transmitting module transmits the trigger signaling; or to receive the CSI, reported by the user equipment, measured in the first measurement window over a PUSCH resource in the M-th sub-frame after the transmitting module transmits the trigger signaling.

In another optional implementation, the receiving module is configured: to receive CSI, reported by the user equipment, measured in a second measurement window after M sub-frames elapse following the end of the second measurement window, wherein the second measurement window is a specified measurement window after the trigger signaling is transmitted and closest to a sub-frame in which the trigger signaling is transmitted, and M is an integer more than or equal to 0; or to receive CSI, reported by the user equipment, measured in a second measurement window after M sub-frames elapse since the transmitting module transmits the trigger signaling, wherein the second measurement window is a specified measurement window after the trigger signaling is transmitted and closest to a sub-frame in which the trigger signaling is transmitted, and M is an integer more than or equal to 0.

Optionally the receiving module is configured: to receive the CSI, reported by the user equipment, measured in the second measurement window over the latest PUCCH resource after M sub-frames elapse following the end of the second measurement window; or to receive the CSI, reported by the user equipment, measured in the second measurement window over a PUSCH resource in the M-th sub-frame following the end of the second measurement window; or to receive the CSI, reported by the user equipment, measured in the second measurement window over the latest PUCCH resource after M sub-frames elapse since the transmitting module transmits the trigger signaling; or to receive the CSI, reported by the user equipment, measured in the second measurement window over a PUSCH resource in the M-th sub-frame after the transmitting module transmits the trigger signaling.

An embodiment of the invention provides a user equipment including a receiver, a transmitter, and at least one processor connected respectively with the receiver and the transmitter, wherein the receiver is configured to receive a trigger signaling transmitted by a base station, wherein the trigger signaling is configured to indicate the user equipment to report Channel State Information (CSI) measured in a specified measurement window; and the processor is configured to read and execute program in a memory to trigger the transmitter to report the CSI measured by the processor in the measurement window to the base station.

Optionally the length of the measurement window is predefined; or the length of the measurement window is informed by the base station to the device via higher-layer signaling; or the trigger signaling includes information about the length of the measurement window, wherein the information about the length of the measurement window is the length of the measurement window, or is indication information indicating that the length of the measurement window is a predefined fixed length or a length indicated in higher-layer signaling.

Optionally the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, wherein N is the number of consecutive sub-frames between a sub-frame in which the trigger signaling is received and a sub-frame in which the CSI is reported.

Further to any one of the embodiments above, in an optional implementation, the processor is configured: to trigger the transmitter to report CSI measured by the processor in a first measurement window to the base station after M sub-frames elapse since the receiver receives the trigger signaling, wherein the first measurement window is a measurement window before the trigger signaling is received and closest to a sub-frame in which the trigger signaling is received, and M is an integer more than or equal to 0.

Optionally the processor is configured: to trigger the transmitter to report the CSI measured by the processor in the first measurement window to the base station over the latest PUCCH resource after M sub-frames elapse since the receiver receives the trigger signaling; or to trigger the transmitter to report the CSI measured by the processor in the first measurement window to the base station over a PUSCH resource in the M-th sub-frame after the receiver receives the trigger signaling.

In another optional implementation, the processor is configured: to trigger the transmitter to report CSI measured by the processor in a second measurement window to the base station after M sub-frames elapse following the end of the second measurement window, wherein the second measurement window is a specified measurement window after the trigger signaling is received and closest to a sub-frame in which the trigger signaling is received, and M is an integer more than or equal to 0; or to trigger the transmitter to report CSI measured by the processor in a second measurement window to the base station after M sub-frames elapse since the receiver receives the trigger signaling, wherein the second measurement window is a specified measurement window after the trigger signaling is received and closest to a sub-frame in which the trigger signaling is received, and M is an integer more than or equal to 0.

Optionally the processor is configured: to trigger the transmitter to report the CSI measured by the processor in the second measurement window to the base station over the latest PUCCH resource after M sub-frames elapse following the end of the second measurement window; or to trigger the transmitter to report the CSI measured by the processor in the second measurement window to the base station over a PUSCH resource in the M-th sub-frame following the end of the second measurement window; or to trigger the transmitter to report the CSI measured by the processor in the second measurement window to the base station over the latest PUCCH resource after M sub-frames elapse since the receiver receives the trigger signaling; or to trigger the transmitter to report the CSI measured by the processor in the second measurement window to the base station over a PUSCH resource in the M-th sub-frame after the receiver receives the trigger signaling.

An embodiment of the invention provides a base station including a receiver, a transmitter, and at least one processor connected respectively with the receiver and the transmitter, wherein the processor is configured to read and execute program in a memory to trigger the transmitter to transmit a trigger signaling to a user equipment to indicate the user equipment to report Chanel State Information (CSI) measured in a specified measurement window; and the receiver is configured to receive the CSI, reported by the user equipment, measured in the measurement window.

Optionally the length of the measurement window is predefined; or the length of the measurement window is informed by the base station to the user equipment via higher-layer signaling; or the trigger signaling includes information about the length of the measurement window, wherein the information about the length of the measurement window is the length of the measurement window, or is indication information indicating that the length of the measurement window is a predefined fixed length or a length indicated in higher-layer signaling.

Optionally the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, wherein N is the number of consecutive sub-frames between a sub-frame in which the trigger signaling is transmitted and a sub-frame in which the CSI reported by the user equipment is received.

Further to any one of the embodiments above, in a optional implementation, the receiver is configured: to receive CSI, reported by the user equipment, measured in a first measurement window after M sub-frames elapse since the transmitter transmits the trigger signaling, wherein the first measurement window is a measurement window before the trigger signaling is transmitted and closest to a sub-frame in which the trigger signaling is transmitted, and M is an integer more than or equal to 0.

Optionally the receiver is configured: to receive the CSI, reported by the user equipment, measured in the first measurement window over the latest PUCCH resource after M sub-frames elapse since the transmitter transmits the trigger signaling; or to receive the CSI, reported by the user equipment, measured in the first measurement window over a PUSCH resource in the M-th sub-frame after the transmitter transmits the trigger signaling.

In another optional implementation, the receiver is configured: to receive CSI, reported by the user equipment, measured in a second measurement window after M sub-frames elapse following the end of the second measurement window, wherein the second measurement window is a specified measurement window after the trigger signaling is transmitted and closest to a sub-frame in which the trigger signaling is transmitted, and M is an integer more than or equal to 0; or to receive CSI, reported by the user equipment, measured in a second measurement window after M sub-frames elapse since the transmitter transmits the trigger signaling, wherein the second measurement window is a specified measurement window after the trigger signaling is transmitted and closest to a sub-frame in which the trigger signaling is transmitted, and M is an integer more than or equal to 0.

Optionally the receiver is configured: to receive the CSI, reported by the user equipment, measured in the second measurement window over the latest PUCCH resource after M sub-frames elapse following the end of the second measurement window; or to receive the CSI, reported by the user equipment, measured in the second measurement window over a PUSCH resource in the M-th sub-frame following the end of the second measurement window; or to receive the CSI, reported by the user equipment, measured in the second measurement window over the latest PUCCH resource after M sub-frames elapse since the transmitter transmits the trigger signaling; or to receive the CSI, reported by the user equipment, measured in the second measurement window over a PUSCH resource in the M-th sub-frame after the transmitter transmits the trigger signaling.

An embodiment of the invention provides a device for feeding back channel state information, the device including a receiver, a transmitter, and at least one processor connected respectively with the receiver and the transmitter, wherein:

the receiver is configured to receive a trigger signaling transmitted by a base station, wherein the trigger signaling is configured to indicate the user equipment to report Channel State Information (CSI) measured in a specified measurement window; and the processor is configured to read and execute program in a memory to trigger the transmitter to report the CSI measured by the processor in the measurement window to the base station.

In the embodiment of the invention, the length of the measurement window is predefined; or the length of the measurement window is informed by the base station to the device via higher-layer signaling; or the trigger signaling includes information about the length of the measurement window, wherein the information about the length of the measurement window is the length of the measurement window, or is indication information indicating that the length of the measurement window is a predefined fixed length or a length indicated in higher-layer signaling.

Optionally the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, wherein N is the number of consecutive sub-frames between a sub-frame in which the trigger signaling is received and a sub-frame in which the CSI is reported.

Optionally the processor is configured: to trigger the transmitter to report CSI measured by the processor in a first measurement window to the base station after M sub-frames elapse since the receiver receives the trigger signaling, wherein the first measurement window is a measurement window before the trigger signaling is received and closest to a sub-frame in which the trigger signaling is received, and M is an integer more than or equal to 0.

Optionally the processor is configured: to trigger the transmitter to report the CSI measured by the processor in the first measurement window to the base station over the latest PUCCH resource after M sub-frames elapse since the receiver receives the trigger signaling; or to trigger the transmitter to report the CSI measured by the processor in the first measurement window to the base station over a PUSCH resource in the M-th sub-frame after the receiver receives the trigger signaling.

The processor is configured: to trigger the transmitter to report CSI measured by the processor in a second measurement window to the base station after M sub-frames elapse following the end of the second measurement window, wherein the second measurement window is a specified measurement window after the trigger signaling is received and closest to a sub-frame in which the trigger signaling is received, and M is an integer more than or equal to 0; or to trigger the transmitter to report CSI measured by the processor in a second measurement window to the base station after M sub-frames elapse since the receiver receives the trigger signaling, wherein the second measurement window is a specified measurement window after the trigger signaling is received and closest to a sub-frame in which the trigger signaling is received, and M is an integer more than or equal to 0.

The processor is configured: to trigger the transmitter to report the CSI measured by the processor in the second measurement window to the base station over the latest PUCCH resource after M sub-frames elapse following the end of the second measurement window; or to trigger the transmitter to report the CSI measured by the processor in the second measurement window to the base station over a PUSCH resource in the M-th sub-frame following the end of the second measurement window; or to trigger the transmitter to report the CSI measured by the processor in the second measurement window to the base station over the latest PUCCH resource after M sub-frames elapse since the receiver receives the trigger signaling; or to trigger the transmitter to report the CSI measured by the processor in the second measurement window to the base station over a PUSCH resource in the M-th sub-frame after the receiver receives the trigger signaling.

An embodiment of the invention provides a device for controlling feedback of channel state information, the device including a receiver, a transmitter, and at least one processor connected respectively with the receiver and the transmitter, wherein the processor is configured to read and execute program in a memory to trigger the transmitter to transmit a trigger signaling to a user equipment to indicate the user equipment to report Chanel State Information (CSI) measured in a specified measurement window; and the receiver is configured to receive the CSI, reported by the user equipment, measured in the measurement window.

In the embodiment of the invention, the length of the measurement window is predefined; or the length of the measurement window is informed by the base station to the user equipment via higher-layer signaling; or the trigger signaling includes information about the length of the measurement window, wherein the information about the length of the measurement window is the length of the measurement window, or is indication information indicating that the length of the measurement window is a predefined fixed length or a length indicated in higher-layer signaling.

Furthermore the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, wherein N is the number of consecutive sub-frames between a sub-frame in which the trigger signaling is transmitted and a sub-frame in which the CSI reported by the user equipment is received.

Optionally the receiver is configured: to receive CSI, reported by the user equipment, measured in a first measurement window after M sub-frames elapse since the transmitter transmits the trigger signaling, wherein the first measurement window is a measurement window before the trigger signaling is transmitted and closest to a sub-frame in which the trigger signaling is transmitted, and M is an integer more than or equal to 0.

Optionally the receiver is configured: to receive the CSI, reported by the user equipment, measured in the first measurement window over the latest PUCCH resource after M sub-frames elapse since the transmitter transmits the trigger signaling; or to receive the CSI, reported by the user equipment, measured in the first measurement window over a PUSCH resource in the M-th sub-frame after the transmitter transmits the trigger signaling.

Optionally the receiver is configured: to receive CSI, reported by the user equipment, measured in a second measurement window after M sub-frames elapse following the end of the second measurement window, wherein the second measurement window is a specified measurement window after the trigger signaling is transmitted and closest to a sub-frame in which the trigger signaling is transmitted, and M is an integer more than or equal to 0; or to receive CSI, reported by the user equipment, measured in a second measurement window after M sub-frames elapse since the transmitter transmits the trigger signaling, wherein the second measurement window is a specified measurement window after the trigger signaling is transmitted and closest to a sub-frame in which the trigger signaling is transmitted, and M is an integer more than or equal to 0.

Optionally the receiver is configured: to receive the CSI, reported by the user equipment, measured in the second measurement window over the latest PUCCH resource after M sub-frames elapse following the end of the second measurement window; or to receive the CSI, reported by the user equipment, measured in the second measurement window over a PUSCH resource in the M-th sub-frame following the end of the second measurement window; or to receive the CSI, reported by the user equipment, measured in the second measurement window over the latest PUCCH resource after M sub-frames elapse since the transmitter transmits the trigger signaling; or to receive the CSI, reported by the user equipment, measured in the second measurement window over a PUSCH resource in the M-th sub-frame after the transmitter transmits the trigger signaling.

The embodiments of the invention provide a solution to feedback of channel state information based upon aperiodical transmission of a CSI-RS, and the user equipment reports the CSI measured by the user equipment in the specified measurement window to the base station upon reception of the trigger signaling transmitted by the base station. Since the user equipment only reports the CSI measured by the user equipment in the specified measurement window, the frequency at which the user equipment feeds back the CSI and also an overhead of CSI feedback can be lowered.

DETAILED DESCRIPTION OF THE EMBODIMENTS

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described here are only a part but not all of the embodiments of the invention. Based upon the embodiments here of the invention, all the other embodiments which can occur to those ordinarily skilled in the art without any inventive effort shall fall into the scope of the invention as claimed.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS), etc.

It shall be further appreciated that in the embodiments of the invention, a User Equipment (UE) includes but will not be limited to a Mobile Station (MS), a mobile terminal, a mobile telephone, a handset, a portable equipment, etc., and the user equipment can communicate with one or more core networks over a Radio Access Network (RAN). For example, the user equipment can be a mobile phone (referred to as a "cellular" phone), a computer capable of radio communication, and the user equipment can also be a portable, pocket, handheld, in-computer, on-vehicle mobile device.

In the embodiments of the invention, a base station (e.g., an access point) can refer to a device, in an access network communicating with a radio terminal in one or more sectors via an air interface. The base station can be configured to convert a received air frame into an IP packet, or a received IP packet into an air frame, and to act as a router between the radio terminal and the remaining part of the access network, where the remaining part of the access network can include an Internet Protocol (IP) network. The base station can further coordinate attribute management on the air interface. For example, the base station can be a Base Transceiver Station (BTS) in the GSM or CDMA system, or can be a Node B in the WCDMA system, or can be an evolved Node B (eNB or e-Node B) in the LTE system, although the embodiments of the invention will not be limited thereto.

The embodiments of the invention will be described below in further details with reference to the drawings. It shall be appreciated that the embodiments described here are merely intended to illustrate and explain the invention, but not to limit the invention thereto.

Figure 1A:
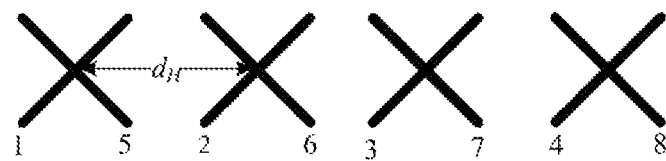
FIG. 1A is a schematic structural diagram of a first array of antennas in a base station.
Figure 1B:
FIG. 1B is a schematic structural diagram of a second array of antennas in a base station.
Figure 2A:
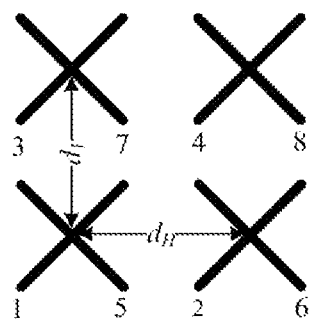
FIG. 2A is a schematic structural diagram of a third array of antennas in a base station.
Figure 2B:
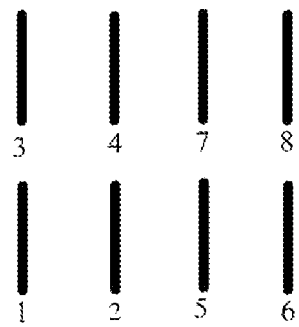
FIG. 2B is a schematic structural diagram of a fourth array of antennas in a base station.
Figure 3:
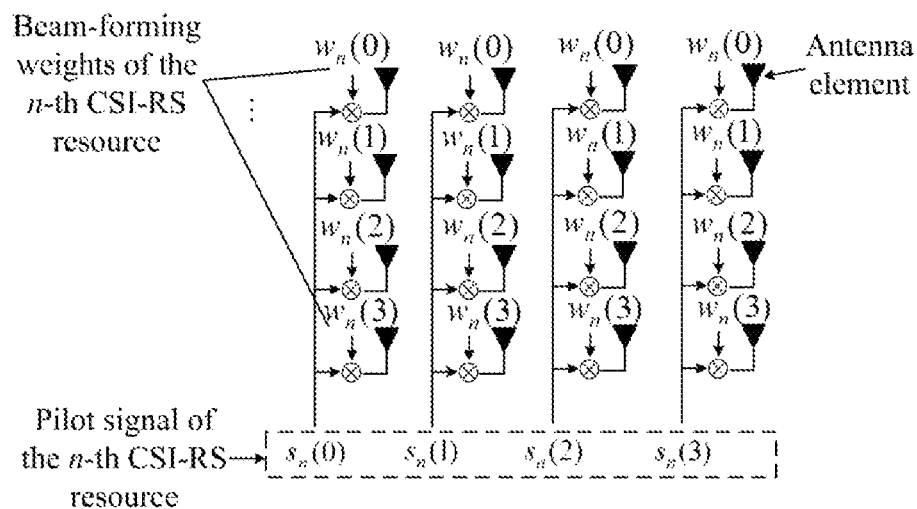
FIG. 3 is a schematic diagram of a method for transmitting a CSI-RS.
Figure 4:
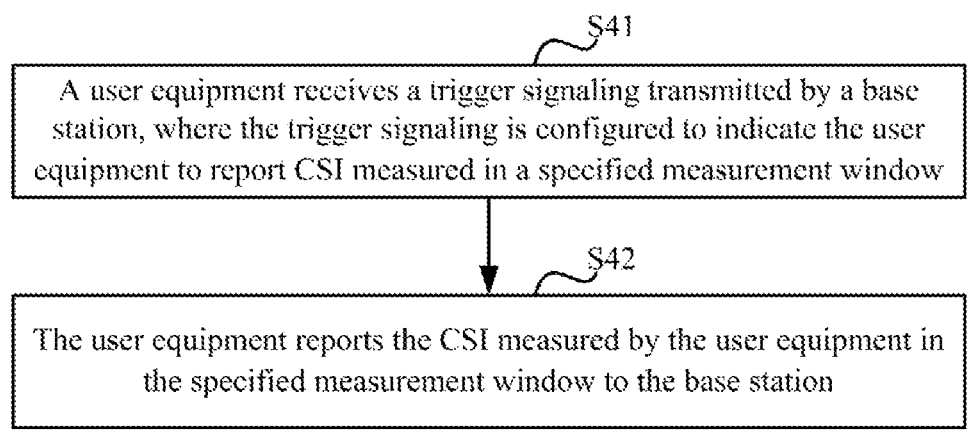
FIG. 4 is a schematic diagram of a method for feeding back channel state information according to an embodiment of the invention.

An embodiment of the invention provides a method for feeding back channel state information, and as illustrated in FIG. 4, the method includes the following steps.

S41: A user equipment receives a trigger signaling transmitted by a base station, where the trigger signaling is configured to indicate the user equipment to report CSI measured in a specified measurement window.

S42: The user equipment reports the CSI measured by the user equipment in the specified measurement window to the base station.

The embodiment of the invention provides a solution to feedback of channel state information, where the user equipment reports the CSI measured by the user equipment in the specified measurement window to the base station upon reception of the trigger signaling transmitted by the base station. Since the user equipment only reports the CSI measured by the user equipment in the specified measurement window, the frequency at which the user equipment feeds back the CSI and also an overhead of CSI feedback can be lowered.

In the embodiment of the invention, the trigger signaling includes configuration information indicating downlink reference signals corresponding to CSI measurement by the user equipment, or indication information of a set of configuration information of downlink reference signals corresponding to CSI measurement by the user equipment.

Where the configuration information of the downlink reference signals includes CSI-RS resource configurations, Cell-specific Reference Signal (CRS) resource configurations, interference measurement resource configurations, etc.

It shall be noted that the base station and the user equipment know in advance the configuration information of all the downlink reference signals, and the base station indicates via the trigger signaling the configuration information of the downlink reference signals corresponding to CSI measurement by the user equipment. For example, the indication information indicates the configuration information in 2 bits, where 00 represents a CSI-RS resource configuration 1, 01 represents a CSI-RS resource configuration 2, 10 represents a CSI-RS resource configuration 3, etc.

The base station and the user equipment know in advance the set of configuration information of all the downlink reference signals, and the base station indicates via the trigger signaling the set of configuration information of the downlink reference signals corresponding to CSI measurement by the user equipment. For example, the indication information indicates the configuration information in 2 bits, where 00 represents a set of a CSI-RS resource configuration 1 and a CSI-RS resource configuration 2, 01 represents a set of the CSI-RS resource configuration 1 and a CSI-RS resource configuration 3, 10 represents a set of the CSI-RS resource configuration 1, the CSI-RS resource configuration 2 and the CSI-RS resource configuration 3, etc.

In the embodiment of the invention, there are the following three optional implementations of the length of the specified measurement window.

In a first implementation, the length of the specified measurement window is predefined.

Particularly the length of the measurement window can be predefined in any way as long as the base station side and the user equipment side have the same knowledge of the length of the measurement window. For example, the length of the measurement window can be defined in a specification or a protocol, agreed on among manufacturers, etc.

In a second implementation, the length of the specified measurement window is informed by the base station to the user equipment via higher-layer signaling.

Particularly the base station specifies the length of the specified measurement window, and notifies the length of the specified measurement window to the user equipment via higher-layer signaling, e.g., Radio Resource Control (RRC) or Media Access Control (MAC) signaling.

In a third implementation, the trigger signaling includes information about the length of the specified measurement window, where the information about the length of the specified measurement window is a particular value of the length of the specified measurement window, or is indication information indicating that the length of the specified measurement window is a predefined fixed length or a length indicated in higher-layer signaling.

Particularly the base station can notify the user equipment the length of the specified measurement window via the trigger signaling, where the trigger signaling can carry the length of the specified measurement window directly, or can carry the indication information indicating that the length of the specified measurement window is the predefined fixed length or the length indicated in the higher-layer signaling. The user equipment can know whether the length of the specified measurement window is the predefined fixed length or the length informed by the base station to the user equipment via the higher-layer signaling, upon reception of the indication information. By way of an example, the indication information indicates the length of the specified measurement window in 1 bit, where 0 represents that the length of the specified measurement window is the predefined fixed length, and 1 represents that the length of the specified measurement window is the length indicated in the higher-layer signaling.

Further to any one of the implementations above, the length of the specified measurement window is the number of sub-frames for CSI measurement in the measurement window; or the length of the specified measurement window is the number of consecutive sub-frames in the measurement window.

Particularly the length of the specified measurement window can be defined as the number k of sub-frames for CSI measurement in the measurement window, and for example, the sub-frames for CSI measurement are CSI-RS transmission sub-frames. By way of an example, if the number of sub-frames for CSI measurement in the specified measurement window is k, then it indicates that there shall be k sub-frames for CSI measurement in the measurement window, but the number of real consecutive sub-frames in the measurement window will not be limited.

Optionally the number of consecutive sub-frames in the specified measurement window is a value less than or equal to N, where N is the number of consecutive sub-frames between a sub-frame in which the user equipment receives the trigger signaling and a sub-frame in which the user equipment reports the CSI.

Further to any one of the implementations above, the user equipment reports the CSI measured in the specified measurement window to the base station in S42 in the following three implementations.

In a first implementation, the user equipment reports CSI measured in a first measurement window to the base station after M sub-frames elapse since the trigger signaling is received, where the first measurement window is a specified measurement window before the trigger signaling is received and closest to a sub-frame in which the trigger signaling is received, and M is an integer more than or equal to 0.

Where the value of M is predefined, or determined and informed by the base station to the user equipment via higher-layer signaling, or determined and informed by the base station via the trigger signaling. For example, M is 4 in the Frequency Division Duplex (FDD) mode.

In this implementation, the user equipment can measure a received reference signal for CSI all the time, but will not report it until the trigger signaling is received, and then the user equipment may report the CSI measured in a specified measurement window closest to the sub-frame in which the trigger signaling is received (i.e., the first measurement window) to the base station, but will not report any CSI measured in other windows.

Figure 5:
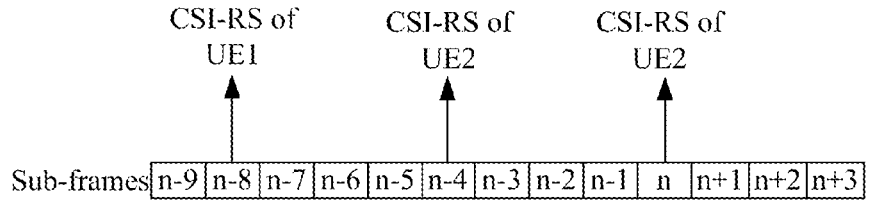
FIG. 5 is a timing diagram of processing in a base station and a user equipment according to an embodiment of the invention.

By way of an example, the first measurement window is determined in such a way that as illustrated in FIG. 5, the base station transmits a CSI-RS signal periodically, and different vertical beam-forming vectors may be applied to a CSI-RS signal in different periods, suppose the period of a CSI-RS is 4. For example, a vertical beam-forming vector of a UE1 is applied to a CSI-RS transmitted in the sub-frame n−8, and a vertical beam-forming vector of a UE2 is applied to a CSI-RS transmitted in sub-frames n−4 and n. The base station transmits a trigger signaling to the UE2 in the sub-frame n+1. If the length of the specified measurement window is two sub-frames for CSI measurement, then the first measurement window for the UE2 may be from the sub-frame n−4 to the sub-frame n; and if the length of the specified measurement window is six sub-frames, then the first measurement window for the UE2 may be from the sub-frame n−5 to the sub-frame n.

Optionally for periodical CSI feedback, the user equipment reports CSI measured in the first measurement window to the base station over the latest Physical Uplink Control Channel (PUCCH) resource after M sub-frames elapse since the trigger signaling is received.

Optionally for aperiodical CSI feedback, the user equipment reports CSI measured in the first measurement window to the base station over a Physical Uplink Shared Channel (PUSCH) resource in the M-th sub-frame after the trigger signaling is received.

In a second implementation, the user equipment reports CSI measured by the user equipment in a second measurement window to the base station after M sub-frames elapse following the end of the second measurement window, where the second measurement window is a specified measurement window after the trigger signaling is received and closest to a sub-frame in which the trigger signaling is received, and M is an integer more than or equal to 0.

Particularly the user equipment does not measure any CSI before the trigger signaling is received, starts to measure CSI upon reception of the trigger signaling and measures CSI in a specified measurement window closest to the sub-frame in which the trigger signaling is received (i.e., the second measurement window), and reports the measured CSI to the base station.

By way of an example, the second measurement window is determined in such a way that as illustrated in FIG. 5 again, the base station transmits a CSI-RS signal periodically, and different vertical beam-forming vectors may be applied to a CSI-RS signal in different periods, suppose the period of a CSI-RS is 4. For example, a vertical beam-forming vector of a UE1 is applied to a CSI-RS transmitted in the sub-frame n−8, and a vertical beam-forming vector of a UE2 is applied to a CSI-RS transmitted in the sub-frames n−4 and n. The base station transmits a trigger signaling to the UE2 in the sub-frame n−6. If the length of the specified measurement window is two sub-frames for CSI measurement, then the second measurement window for the UE2 may be from the sub-frame n−4 to the sub-frame n; and if the length of the specified measurement window is six sub-frames, then the second measurement window for the UE2 will be from the sub-frame n−5 to the sub-frame n.

Optionally for periodical CSI feedback, the user equipment reports the CSI measured by the user equipment in the second measurement window to the base station over the latest PUCCH resource after M sub-frames elapse following the end of the second measurement window.

Optionally for aperiodical CSI feedback, the user equipment reports the CSI measured by the user equipment in the second measurement window to the base station over a PUSCH resource in the M-th sub-frame following the end of the second measurement window.

In a third implementation, the user equipment reports CSI measured by the user equipment by the user equipment in a second measurement window to the base station after M sub-frames elapse since the trigger signaling is received, where the second measurement window is a specified measurement window after the trigger signaling is received and closest to a sub-frame in which the trigger signaling is received, and M is an integer more than or equal to 0.

Optionally for periodical CSI feedback, the user equipment reports the CSI measured by the user equipment in the second measurement window to the base station over the latest PUCCH resource after M sub-frames elapse since the trigger signaling is received.

Optionally for periodical CSI feedback, the user equipment reports the CSI measured by the user equipment in the second measurement window to the base station over a PUSCH resource after M sub-frames elapse since the trigger signaling is received.

In the second implementation and the third implementation above, since the user equipment only needs to measure CSI in the specified measurement window, and to feed back the measured CSI, also the complexity of measurement by the user equipment can be lowered.

It shall be noted that in the FDM MIMO system, a cell may be configured with a plurality of CSI-RS resources, different beam-forming vectors in the vertical dimension are applied to different resources, and if there are too many vertical beams in use in a cell, then there may be a corresponding CSI-RS resource of each beam, so that a lot of physical resources may be occupied by a CSI-RS in the cell, thus degrading the spectrum efficiency. In order to lower an overhead of CSI-RS resources, and to enable a CSI-RS resource to be shared by a plurality of user equipments, the base station can perform beam-forming on the CSI-RS resource using different beam-forming vectors at different instances of time, so that the different user equipments measure and feed back CSI respectively over the CSI-RS resource. Since the existing UE generally determines by itself the length of the measurement window for CSI measurement, it is very likely for the measuring UE to measure a CSI-RS for beam-forming on another UE, thus resulting in an inaccurate measurement result. Accordingly the base station needs to indicate each user equipment to measure CSI at a transmission instance of time of a CSI-RS corresponding to a beam-forming vector specific to the user equipment. Although the base station still transmits a CSI-RS at another instance of time, the transmitted CSI-RS is useless to the user equipment. The solution to feedback of channel state information according to the embodiment of the invention can be applicable to transmission above of CSI-RS, particularly as follows: for the user equipments sharing the same CSI-RS, a pilot signal in a specified measurement window corresponding to each user equipment is obtained by the base station as a result of beam-forming on the CSI-RS resource using a beam-forming vector specific to the user equipment to thereby improve effectively the efficiency of the CSI-RS, and lower an overhead of CSI-RS resources, especially in a scenario in which there are a small number of user equipments to be scheduled in the system.

Figure 6:
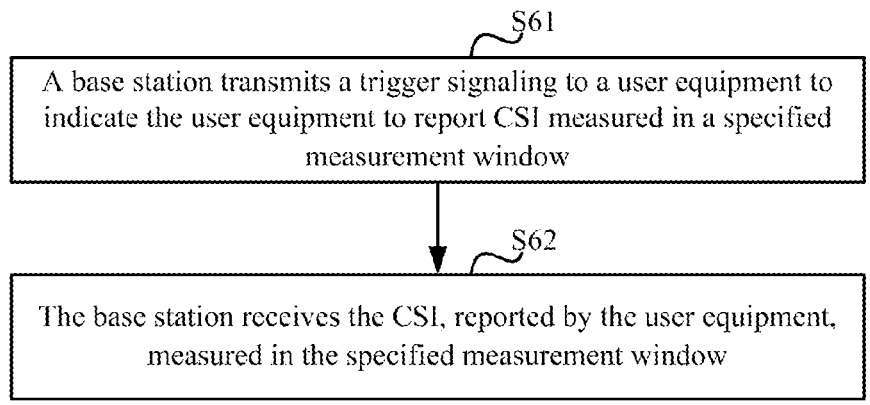
FIG. 6 is a schematic diagram of a method for controlling feedback of channel state information according to an embodiment of the invention.

Based upon the same inventive idea, an embodiment of the invention provides a method for controlling feedback of channel state information, and as illustrated in FIG. 6, the method includes the following steps.

S61: A base station transmits a trigger signaling to a user equipment to indicate the user equipment to report CSI measured in a specified measurement window.

S62: The base station receives the CSI, reported by the user equipment, measured in the specified measurement window.

The embodiment of the invention provides a solution to controlling feedback of channel state information based upon aperiodical CSI-RS transmission, where the base station transmits the trigger signaling to the user equipment to indicate the user equipment to report CSI measured in the specified measurement window; and the base station receives the CSI, reported by the user equipment, measured in the specified measurement window. Since the user equipment only reports the CSI measured by the user equipment in the specified measurement window, the frequency at which the user equipment feeds back the CSI and also an overhead of CSI feedback can be lowered.

In the embodiment of the invention, the length of the specified measurement window is predefined.

Or the length of the specified measurement window is informed by the base station to the user equipment via higher-layer signaling.

Or the trigger signaling includes information about the length of the specified measurement window, where the information about the length of the specified measurement window is a particular value of the length of the specified measurement window, or is indication information indicating that the length of the specified measurement window is a predefined fixed length or a length indicated in higher-layer signaling.

Furthermore the length of the specified measurement window is the number of sub-frames for CSI measurement in the specified measurement window; or the length of the specified measurement window is the number of consecutive sub-frames in the specified measurement window.

Optionally the number of consecutive sub-frames in the specified measurement window is a value less than or equal to N, where N is the number of consecutive sub-frames between a sub-frame in which the base station transmits the trigger signaling and a sub-frame in which the base station receives the CSI reported by the user equipment.

Further to any one of the implementations above, in a first optional implementation, the base station receives the CSI, reported by the user equipment, measured in the specified measurement window in S62 as follows.

The base station receives CSI, reported by the user equipment, measured in a first measurement window after M sub-frames elapse since the trigger signaling is transmitted, where the first measurement window is a specified measurement window before the trigger signaling is transmitted and closest to a sub-frame in which the trigger signaling is transmitted, and M is an integer more than or equal to 0.

Optionally for periodical CSI feedback, the base station receives the CSI, reported by the user equipment, measured in the first measurement window over the latest PUCCH resource after M sub-frames elapse since the trigger signaling is transmitted.

Optionally for aperiodical CSI feedback, the base station receives the CSI, reported by the user equipment, measured in the first measurement window over a PUSCH resource in the M-th sub-frame after the trigger signaling is transmitted.

In a second optional implementation, the base station receives the CSI, reported by the user equipment, measured in the specified measurement window in S62 as follows.

The base station receives CSI, reported by the user equipment, measured in a second measurement window after M sub-frames elapse following the end of the second measurement window, where the second measurement window is a specified measurement window after the trigger signaling is transmitted and closest to a sub-frame in which the trigger signaling is transmitted, and M is an integer more than or equal to 0.

Optionally for periodical CSI feedback, the base station receives the CSI, reported by the user equipment, measured in the second measurement window over the latest PUCCH resource after M sub-frames elapse following the end of the second measurement window.

Optionally for aperiodical CSI feedback, the base station receives the CSI, reported by the user equipment, measured in the second measurement window over a PUSCH resource in the M-th sub-frame following the end of the second measurement window.

In a third optional implementation, the base station receives the CSI, reported by the user equipment, measured in the specified measurement window in S62 as follows.

The base station receives CSI, reported by the user equipment, measured in a second measurement window after M sub-frames elapse since the trigger signaling is transmitted, where the second measurement window is a specified measurement window after the trigger signaling is transmitted and closest to a sub-frame in which the trigger signaling is transmitted, and M is an integer more than or equal to 0.

Optionally for periodical CSI feedback, the base station receives the CSI, reported by the user equipment, measured in the second measurement window over the latest PUCCH resource after M sub-frames elapse since the trigger signaling is transmitted.

Optionally for aperiodical CSI feedback, the base station receives the CSI, reported by the user equipment, measured in the second measurement window over a PUSCH resource in the M-th sub-frame after the trigger signaling is transmitted.

Further to any one of the embodiments above, the trigger signaling includes configuration information indicating downlink reference signals corresponding to CSI measurement by the user equipment, or indication information of a set of configuration information of downlink reference signals corresponding to CSI measurement by the user equipment.

The solution to controlling feedback of channel state information according to the embodiment of the invention can be applicable to aperiodical CSI-RS transmission, and particularly for the user equipments sharing the same CSI-RS, a pilot signal in a specified measurement window corresponding to each user equipment can be obtained by the base station as a result of beam-forming on the CSI-RS resource using a beam-forming vector specific to the user equipment to thereby improve effectively the efficiency of the CSI-RS, and lower an overhead of CSI-RS resources, especially in a scenario in which there are a small number of user equipments to be scheduled in the system.

The solution according to the invention will be described below in connection with two particular embodiments thereof from the perspective of interaction between a user equipment and a base station.

First Embodiment

Figure 7:
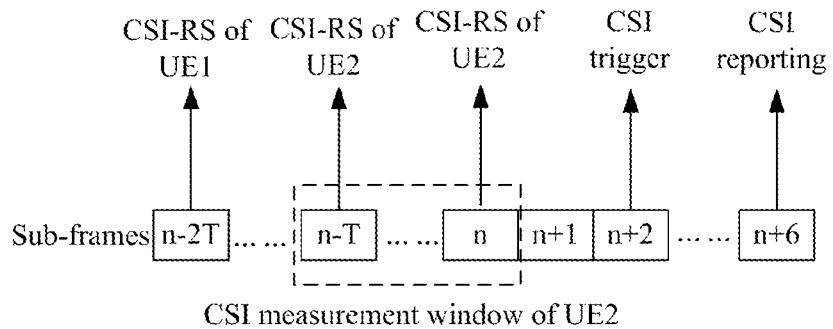
FIG. 7 is a timing diagram of processing in a base station and a user equipment according to a first embodiment of the invention.

1) A base station transmits a CSI-RS signal periodically, and different beam-forming vectors may be applied to a CSI-RS signal in different periods, suppose the period of a CSI-RS is T. For example, a beam-forming vector of a UE1 is applied to a CSI-RS transmitted in the sub-frame n−2T, and a beam-forming vector of a UE2 is applied to a CSI-RS in the sub-frames n−T and n; and FIG. 7 illustrates a timing diagram thereof.

2) The UE2 measures CSI based upon a CSI-RS in each CSI-RS period, and prescribes with the base station that a CSI measurement window includes k=2 sub-frames for CSI measurement (which can also be referred to as CSI measurement sub-frames), so although the UE measures CSI in each CSI-RS period, the UE only stores the CSI measured in the latest two CSI-RS sub-frames.

3) The base station triggers the UE2 via Downlink Control Information (DCI) in the sub-frame n+2 to feed back CSI.

4) The UE2 reports the CSI aperiodically over a PUSCH in the sub-frame n+6 (that is, delayed by M=4 sub-frames) upon reception of the trigger signaling, where the reported CSI is CSI measured in two CSI measurement sub-frames closest to the sub-frame n+2, i.e., CSI measured in the sub-frames n−T and n, so all the CSI reported by the UE is measured based upon a CSI-RS beam-formed using a beam-form vector of the UE.

Second Embodiment

Figure 8:
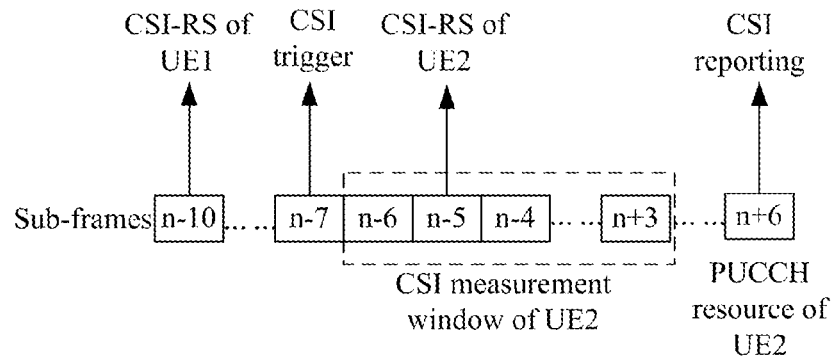
FIG. 8 is a timing diagram of processing in a base station and a user equipment according to a second embodiment of the invention.

1) A base station transmits a CSI-RS signal periodically, and different beam-forming vectors may be applied to a CSI-RS signal in different periods, suppose the period of a CSI-RS is T=5. For example, a beam-forming vector of a UE1 is applied to a CSI-RS transmitted in the sub-frame n−10, and a beam-forming vector of a UE2 is applied to a CSI-RS in the sub-frames n−5 and n; and FIG. 8 illustrates a timing diagram thereof.

2) The UE knows a CSI-RS resource configuration from higher-layer signaling upon reception of the trigger signaling, but will not measure CSI based upon a CSI-RS.

3) The base station triggers the UE2 via DCI in the sub-frame n−7 to measure and feed back CSI. The base station also indicates to the UE2 in the trigger signaling that the size of a CSI measurement window thereof is L=10 sub-frames.

4) Upon reception of the trigger signaling, the UE measures CSI in subsequent L=10 sub-frames, and reports the measured CSI over the latest PUCCH resource following the end of a measurement window (i.e., succeeding to the sub-frame n+3), where the UE can measure channel information based upon two CSI-RS sub-frames in the measurement window (i.e., the sub-frame n−5 and the sub-frame n), and the beam-forming vector of the UE2 is applied to a CSI-RS in these two sub-frames.

It shall be noted that the embodiments above have been described only taking beam-forming in the vertical dimension as an example, but will not be limited to the particular beam-forming scheme, and the base station can alternatively perform beam-forming on a CSI-RS using another beam-forming vector in an embodiment of the invention. For example, the base station can perform beam-forming on a CSI-RS using a beam-forming vector in the horizontal dimension; and in another example, the base station can perform beam-forming on a CSI-RS using a beam-forming vector in the two dimensions including the horizontal and vertical dimensions, etc.

The processing flows of the methods above can be performed in software program, which can be stored in a storage medium, and when the stored software program is invoked, it can perform the steps in the methods above.

Based upon the same inventive idea, an embodiment of the invention further provides a device for feeding back channel state information, and since the device addresses the problem under a similar principle to the method above for feeding back channel state information, reference can be made to the implementation of the method for an implementation of the device, and a repeated description thereof will be omitted here.

Figure 9:
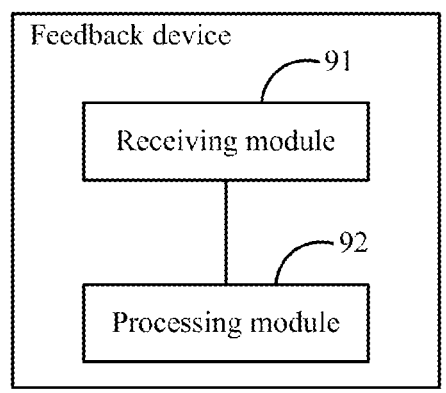
FIG. 9 is a schematic diagram of a device for feeding back channel state information according to an embodiment of the invention.

An embodiment of the invention provides a device for feeding back channel state information, and as illustrated in FIG. 9, the device includes the following modules.

A receiving module 91 is configured to receive a trigger signaling transmitted by a base station, where the trigger signaling is configured to indicate the device to report Channel State Information (CSI) obtained in a specified measurement window.

A processing module 92 is configured to report the CSI measured by the processing module in the measurement window to the base station.

In the embodiment of the invention, the length of the measurement window is predefined.

Or the length of the measurement window is informed by the base station to the device via higher-layer signaling.

Or the trigger signaling includes information about the length of the measurement window, where the information about the length of the measurement window is the length of the measurement window, or is indication information indicating that the length of the measurement window is a predefined fixed length or a length indicated in higher-layer signaling.

Furthermore the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, where N is the number of consecutive sub-frames between a sub-frame in which the trigger signaling is received and a sub-frame in which the CSI is reported.

Further to any one of the embodiments above, in an optional implementation, the processing module 92 is configured to report CSI measured by the processing module in a first measurement window to the base station after M sub-frames elapse since the receiving module 91 receives the trigger signaling, where the first measurement window is a measurement window before the trigger signaling is received and closest to a sub-frame in which the trigger signaling is received, and M is an integer more than or equal to 0.

Optionally the processing module 92 is configured to report the CSI measured by the processing module in the first measurement window to the base station over the latest PUCCH resource after M sub-frames elapse since the receiving module 91 receives the trigger signaling; or to report the CSI measured by the processing module in the first measurement window to the base station over a PUSCH resource in the M-th sub-frame after the receiving module 91 receives the trigger signaling.

In another optional implementation, the processing module 92 is configured to report CSI measured by the processing module in a second measurement window to the base station after M sub-frames elapse following the end of the second measurement window, where the second measurement window is a specified measurement window after the trigger signaling is received and closest to a sub-frame in which the trigger signaling is received, and M is an integer more than or equal to 0; or to report CSI measured by the processing module by the receiving module in a second measurement window to the base station after M sub-frames elapse since the receiving module 91 receives the trigger signaling, where the second measurement window is a specified measurement window after the trigger signaling is received and closest to a sub-frame in which the trigger signaling is received, and M is an integer more than or equal to 0.

Optionally the processing module 92 is configured to report the CSI measured by the processing module in the second measurement window to the base station over the latest PUCCH resource after M sub-frames elapse following the end of the second measurement window; or to report the CSI measured by the processing module in the second measurement window to the base station over a PUSCH resource in the M-th sub-frame following the end of the second measurement window; or to report the CSI measured by the processing module in the second measurement window to the base station over the latest PUCCH resource after M sub-frames elapse since the receiving module 91 receives the trigger signaling; or to report the CSI measured by the processing module in the second measurement window to the base station over a PUSCH resource in the M-th sub-frame after the receiving module 91 receives the trigger signaling.

Based upon the same inventive idea, an embodiment of the invention further provides a device for controlling feedback of channel state information, and since the device addresses the problem under a similar principle to the method above for controlling feedback of channel state information, reference can be made to the implementation of the method for an implementation of the device, and a repeated description thereof will be omitted here.

Figure 10:
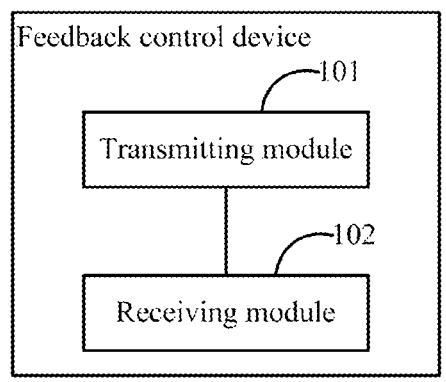
FIG. 10 is a schematic diagram of a device for controlling feedback channel state information according to an embodiment of the invention.

An embodiment of the invention provides a device for controlling feedback of channel state information, and as illustrated in FIG. 10, the device includes the following modules.

A transmitting module 101 is configured to transmit a trigger signaling to a user equipment to indicate the user equipment to report Chanel State Information (CSI) measured in a specified measurement window.

A receiving module 102 is configured to receive the CSI, reported by the user equipment, measured in the measurement window.

In the embodiment of the invention, the length of the measurement window is predefined.

Or the length of the measurement window is informed by the device to the user equipment via higher-layer signaling.

Or the trigger signaling includes information about the length of the measurement window, where the information about the length of the measurement window is the length of the measurement window, or is indication information indicating that the length of the measurement window is a predefined fixed length or a length indicated in higher-layer signaling.

Furthermore the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, where N is the number of consecutive sub-frames between a sub-frame in which the trigger signaling is transmitted and a sub-frame in which the CSI reported by the user equipment is received.

Further to any one of the embodiments above, in an optional implementation, the receiving module 102 is configured to receive CSI, reported by the user equipment, measured in a first measurement window after M sub-frames elapse since the transmitting module 101 transmits the trigger signaling, where the first measurement window is a measurement window before the trigger signaling is transmitted and closest to a sub-frame in which the trigger signaling is transmitted, and M is an integer more than or equal to 0.

Optionally the receiving module 102 is configured to receive the CSI, reported by the user equipment, measured in the first measurement window over the latest PUCCH resource after M sub-frames elapse since the transmitting module 101 transmits the trigger signaling; or to receive the CSI, reported by the user equipment, measured in the first measurement window over a PUSCH resource in the M-th sub-frame after the transmitting module 101 transmits the trigger signaling.

In another optional implementation, the receiving module 102 is configured to receive CSI, reported by the user equipment, measured in a second measurement window after M sub-frames elapse following the end of the second measurement window, where the second measurement window is a specified measurement window after the trigger signaling is transmitted and closest to a sub-frame in which the trigger signaling is transmitted, and M is an integer more than or equal to 0; or to receive CSI, reported by the user equipment, measured in a second measurement window after M sub-frames elapse since the transmitting module 101 transmits the trigger signaling, where the second measurement window is a specified measurement window after the trigger signaling is transmitted and closest to a sub-frame in which the trigger signaling is transmitted, and M is an integer more than or equal to 0.

Optionally the receiving module 102 is configured to receive the CSI, reported by the user equipment, measured in the second measurement window over the latest PUCCH resource after M sub-frames elapse following the end of the second measurement window; or to receive the CSI, reported by the user equipment, measured in the second measurement window over a PUSCH resource in the M-th sub-frame following the end of the second measurement window; or to receive the CSI, reported by the user equipment, measured in the second measurement window over the latest PUCCH resource after M sub-frames elapse since the transmitting module 101 transmits the trigger signaling; or to receive the CSI, reported by the user equipment, measured in the second measurement window over a PUSCH resource in the M-th sub-frame after the transmitting module 101 transmits the trigger signaling.

The structure of and processing in the user equipment according to the embodiment of the invention will be described below in connection with an optional hardware structure thereof.

Figure 11:
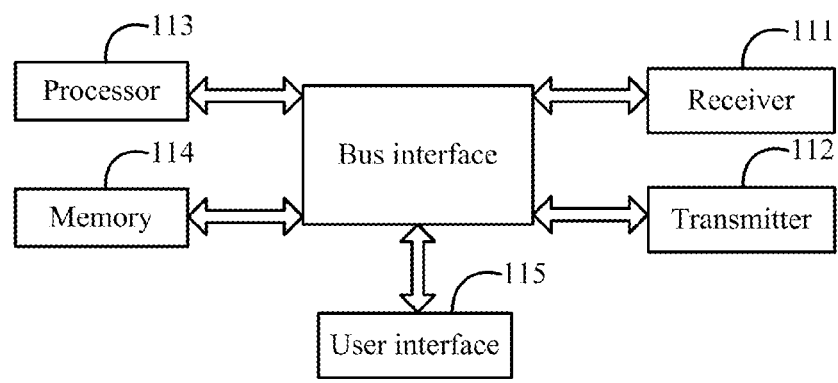
FIG. 11 is a schematic diagram of a user equipment according to an embodiment of the invention.

In the embodiment illustrated in FIG. 11, the user equipment includes a receiver 111, a transmitter 112, and at least one processor 113 connected respectively with the receiver 111 and the transmitter 112.

The receiver 111 is configured to receive a trigger signaling transmitted by a base station, where the trigger signaling is configured to indicate the user equipment to report CSI measured in a specified measurement window.

The processor 113 is configured to read and execute program in a memory 114 to trigger the transmitter 112 to report the CSI measured by the processor 113 in the measurement window to the base station.

In FIG. 11, the bus architecture can include any number of interconnecting buses and bridges to particularly link together various circuits including one or more processors represented by the processor 113, and one or more memories represented by the memory 114. The bus architecture can further link together various other circuits, e.g., prophetical devices, manostats, power management circuits, etc., all of which are well known in the art, so a further description thereof will be omitted in this context. The bus interface serves as an interface. The receiver 111 and the transmitter 112 provide units for communication with various other devices over a transmission medium. For different user equipments, a user interface 115 can also be an interface via which desirable devices can be connected internally or externally, and the connected devices can include but will not be limited to a keypad, a display, a speaker, a microphone, a joystick, etc.

The processor 113 is responsible for managing the bus architecture and performing normal processes, and the memory 114 can store data for use by the processor 113 in performing the operations.

In the embodiment of the invention, the length of the measurement window is predefined.

Or the length of the measurement window is informed by the base station to the user equipment via higher-layer signaling.

Or the trigger signaling includes information about the length of the measurement window, where the information about the length of the measurement window is the length of the measurement window, or is indication information indicating that the length of the measurement window is a predefined fixed length or a length indicated in higher-layer signaling.

Furthermore the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, where N is the number of consecutive sub-frames between a sub-frame in which the trigger signaling is received, and a sub-frame in which the CSI is reported.

Further to any one of the embodiments above, in an optional implementation, the processor 113 is configured to trigger the transmitter 112 to report CSI measured by the processor 113 in a first measurement window to the base station after M sub-frames elapse since the receiver 111 receives the trigger signaling, where the first measurement window is a measurement window before the trigger signaling is received and closest to a sub-frame in which the trigger signaling is received, and M is an integer more than or equal to 0.

Optionally the processor 113 is configured to trigger the transmitter 112 to report CSI measured by the processor 113 in the first measurement window to the base station over the latest PUCCH resource after M sub-frames elapse since the receiver 111 receives the trigger signaling; or to trigger the transmitter 112 to report CSI measured by the processor 113 in the first measurement window to the base station over a PUSCH resource in the M-th sub-frame after the receiver 111 receives the trigger signaling.

In another optional implementation, the processor 113 is configured to trigger the transmitter 112 to report CSI measured by the processor 113 in a second measurement window to the base station after M sub-frames elapse following the end of the second measurement window, where the second measurement window is a specified measurement window after the trigger signaling is received and closest to a sub-frame in which the trigger signaling is received, and M is an integer more than or equal to 0; or to trigger the transmitter 112 to report CSI measured by the processor 113 in a second measurement window to the base station after M sub-frames elapse since the receiver 111 receives the trigger signaling, where the second measurement window is a specified measurement window after the trigger signaling is received and closest to a sub-frame in which the trigger signaling is received, and M is an integer more than or equal to 0.

Optionally the processor 113 is configured to trigger the transmitter 112 to report the CSI measured by the processor 113 in the second measurement window to the base station over the latest PUCCH resource after M sub-frames elapse following the end of the second measurement window; or to trigger the transmitter 112 to report the CSI measured by the processor 113 in the second measurement window to the base station over a PUSCH resource in the M-th sub-frame following the end of the second measurement window; or to trigger the transmitter 112 to report the CSI measured by the processor 113 in the second measurement window to the base station over the latest PUCCH resource after M sub-frames elapse since the receiver 111 receives the trigger signaling; or to trigger the transmitter 112 to report the CSI measured by the processor 113 in the second measurement window to the base station over a PUSCH resource in the M-th sub-frame after the receiver 111 receives the trigger signaling.

The structure of and processing in the base station according to the embodiment of the invention will be described below in connection with an optional hardware structure thereof.

Figure 12:
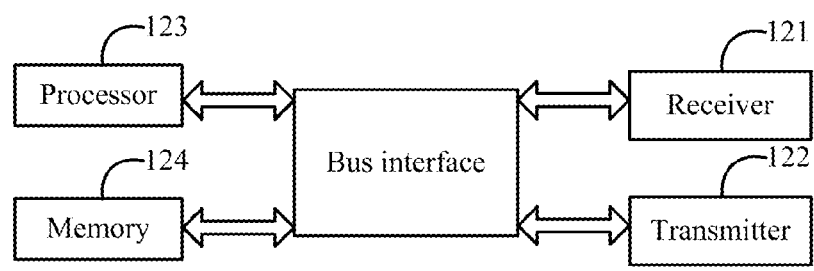
FIG. 12 is a schematic diagram of a base station according to an embodiment of the invention.

In the embodiment illustrated in FIG. 12, the base station includes a receiver 121, a transmitter 122, and at least one processor 123 connected respectively with the receiver 121 and the transmitter 122.

The processor 123 is configured to read and execute program in a memory 124 to trigger the transmitter 122 to transmit a trigger signaling to a user equipment to indicate the user equipment to report Chanel State Information (CSI) measured in a specified measurement window.

The receiver 121 is configured to receive the CSI, reported by the user equipment, measured in the measurement window.

In FIG. 12, the bus architecture can include any number of interconnecting buses and bridges to particularly link together various circuits including one or more processors represented by the processor 123, and one or more memories represented by the memory 124. The bus architecture can further link together various other circuits, e.g., prophetical devices, manostats, power management circuits, etc., all of which are well known in the art, so a further description thereof will be omitted in this context. The bus interface serves as an interface. The receiver 121 and the transmitter 122 provide units for communication with various other devices over a transmission medium. The processor 123 is responsible for managing the bus architecture and performing normal processes, and the memory 124 can store data for use by the processor 123 in performing the operations.

In the embodiment of the invention, the length of the measurement window is predefined.

Or the length of the measurement window is informed by the base station to the user equipment via higher-layer signaling.

Or the trigger signaling includes information about the length of the measurement window, where the information about the length of the measurement window is the length of the measurement window, or is indication information indicating that the length of the measurement window is a predefined fixed length or a length indicated in higher-layer signaling.

Furthermore the length of the measurement window is the number of sub-frames for CSI measurement in the measurement window; or the length of the measurement window is the number of consecutive sub-frames in the measurement window.

Optionally the number of consecutive sub-frames in the measurement window is a value less than or equal to N, where N is the number of consecutive sub-frames between a sub-frame in which the trigger signaling is transmitted, and a sub-frame in which the CSI reported by the user equipment is received.

Further to any one of the embodiments above, in an optional implementation, the receiver 121 is configured to receive CSI, reported by the user equipment, measured in a first measurement window after M sub-frames elapse since the transmitter 122 transmits the trigger signaling, where the first measurement window is a measurement window before the trigger signaling is transmitted and closest to a sub-frame in which the trigger signaling is transmitted, and M is an integer more than or equal to 0.

Optionally the receiver 121 is configured to receive the CSI, reported by the user equipment, measured in the first measurement window over the latest PUCCH resource after M sub-frames elapse since the transmitter 122 transmits the trigger signaling; or to receive the CSI, reported by the user equipment, measured in the first measurement window over a PUSCH resource in the M-th sub-frame after the transmitter 122 transmits the trigger signaling.

In another optional implementation, the receiver 121 is configured to receive CSI, reported by the user equipment, measured in a second measurement window after M sub-frames elapse following the end of the second measurement window, where the second measurement window is a specified measurement window after the trigger signaling is transmitted and closest to a sub-frame in which the trigger signaling is transmitted, and M is an integer more than or equal to 0; or to receive CSI, reported by the user equipment, measured in a second measurement window after M sub-frames elapse since the transmitter 122 transmits the trigger signaling, where the second measurement window is a specified measurement window after the trigger signaling is transmitted and closest to a sub-frame in which the trigger signaling is transmitted, and M is an integer more than or equal to 0.

Optionally the receiver 121 is configured to receive the CSI, reported by the user equipment, measured in the second measurement window over the latest PUCCH resource after M sub-frames elapse following the end of the second measurement window; or to receive the CSI, reported by the user equipment, measured in the second measurement window over a PUSCH resource in the M-th sub-frame following the end of the second measurement window; or to receive the CSI, reported by the user equipment, measured in the second measurement window over the latest PUCCH resource after M sub-frames elapse since the transmitter 122 transmits the trigger signaling; or to receive the CSI, reported by the user equipment, measured in the second measurement window over a PUSCH resource in the M-th sub-frame after the transmitter 122 transmits the trigger signaling.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for feeding back channel state information, the method comprising:
    receiving, by a user equipment, a trigger signaling transmitted by a base station, wherein the trigger signaling is configured to indicate the user equipment to report Channel State Information (CSI) obtained in a specified measurement window; and
    reporting, by the user equipment, the CSI measured by the user equipment in the measurement window to the base station;
    wherein reporting, by the user equipment, the CSI measured in the measurement window to the base station comprises:
    reporting, by the user equipment, CSI measured by the user equipment in a first measurement window to the base station after M sub-frames elapse since the trigger signaling is received, wherein the first measurement window is a measurement window before the trigger signaling is received and closest to a sub-frame in which the trigger signaling is received, and M is an integer more than or equal to 0; or
    reporting, by the user equipment, CSI measured by the user equipment in a second measurement window to the base station after M sub-frames elapse following the end of the second measurement window, wherein the second measurement window is a specified measurement window after the trigger signaling is received and closest to a sub-frame in which the trigger signaling is received, and M is an integer more than or equal to 0; or
    reporting, by the user equipment, CSI measured by the user equipment in a second measurement window to the base station after M sub-frames elapse since the trigger signaling is received, wherein the second measurement window is a specified measurement window after the trigger signaling is received and closest to a sub-frame in which the trigger signaling is received, and M is an integer more than or equal to 0.

2. The method according to claim 1, wherein the length of the measurement window is predefined; or
    the length of the measurement window is informed by the base station to the user equipment via higher-layer signaling; or
    the trigger signaling comprises information about the length of the measurement window, wherein the information about the length of the measurement window is the length of the measurement window, or is indication information indicating that the length of the measurement window is a predefined fixed length or a length indicated in higher-layer signaling.

3. The method according to claim 2, wherein the length of the measurement window is the number of sub-frames for CSI measurement in the measurement window; or the length of the measurement window is the number of consecutive sub-frames in the measurement window;
    wherein the number of consecutive sub-frames in the measurement window is a value less than or equal to N, wherein N is the number of consecutive sub-frames between a sub-frame in which the user equipment receives the trigger signaling and a sub-frame in which the user equipment reports the CSI.

4. The method according to claim 1, wherein the user equipment reports the CSI measured in the first measurement window to the base station over the latest Physical Uplink Control Channel (PUCCH) resource after M sub-frames elapse since the trigger signaling is received; or
    the user equipment reports the CSI measured in the first measurement window to the base station over a Physical Uplink Shared Channel (PUSCH) resource in the M-th sub-frame after the trigger signaling is received.

5. The method according to claim 1, wherein the user equipment reports the CSI measured by the user equipment in the second measurement window to the base station over the latest PUCCH resource after M sub-frames elapse following the end of the second measurement window; or
    the user equipment reports the CSI measured by the user equipment in the second measurement window to the base station over a PUSCH resource in the M-th sub-frame following the end of the second measurement window; or
    the user equipment reports the CSI measured by the user equipment in the second measurement window to the base station over the latest PUCCH resource after M sub-frames elapse since the trigger signaling is received; or
    the user equipment reports the CSI measured by the user equipment in the second measurement window to the base station over a PUSCH resource in the M-th sub-frame after the trigger signaling is received.

6. The method according to claim 1, wherein the trigger signaling comprises configuration information indicating downlink reference signals corresponding to CSI measurement by the user equipment, or indication information of a set of configuration information of downlink reference signals corresponding to CSI measurement by the user equipment.

7. A method for controlling feedback of channel state information, the method comprising:
    transmitting, by a base station, a trigger signaling to a user equipment to indicate the user equipment to report Channel State Information (CSI) measured in a specified measurement window; and receiving, by the base station, the CSI, reported by the user equipment, measured in the measurement window;
wherein receiving, by the base station, the CSI, reported by the user equipment, measured in the measurement window comprises:
receiving, by the base station, CSI, reported by the user equipment, measured in a first measurement window after M sub-frames elapse since the trigger signaling is transmitted, wherein the first measurement window is a specified measurement window before the trigger signaling is transmitted and closest to a sub-frame in which the trigger signaling is transmitted, and M is an integer more than or equal to 0; or
receiving, by the base station, CSI, reported by the user equipment, measured in a second measurement window after M sub-frames elapse following the end of the second measurement window, wherein the second measurement window is a specified measurement window after the trigger signaling is transmitted and closest to a sub-frame in which the trigger signaling is transmitted, and M is an integer more than or equal to 0; or
receiving, by the base station, CSI, reported by the user equipment, measured in a second measurement window after M sub-frames elapse since the trigger signaling is transmitted, wherein the second measurement window is a specified measurement window after the trigger signaling is transmitted and closest to a sub-frame in which the trigger signaling is transmitted, and M is an integer more than or equal to 0.

8. The method according to claim 7, wherein the length of the measurement window is predefined; or
the length of the measurement window is informed by the base station to the user equipment via higher-layer signaling; or
the trigger signaling comprises information about the length of the measurement window, wherein the information about the length of the measurement window is the length of the measurement window, or is indication information indicating that the length of the measurement window is a predefined fixed length or a length indicated in higher-layer signaling.

9. The method according to claim 8, wherein the length of the measurement window is the number of sub-frames for CSI measurement in the measurement window; or the length of the measurement window is the number of consecutive sub-frames in the measurement window;
wherein the number of consecutive sub-frames in the measurement window is a value less than or equal to N, wherein N is the number of consecutive sub-frames between a sub-frame in which the base station transmits the trigger signaling and a sub-frame in which the base station receives the CSI reported by the user equipment.

10. The method according to claim 7, wherein the base station receives the CSI, reported by the user equipment, measured in the first measurement window over the latest PUCCH resource after M sub-frames elapse since the trigger signaling is transmitted;
or
the base station receives the CSI, reported by the user equipment, measured in the first measurement window over a PUSCH resource in the M-th sub-frame after the trigger signaling is transmitted.

11. The method according to claim 7, wherein the base station receives the CSI, reported by the user equipment, measured in the second measurement window over the latest PUCCH resource after M sub-frames elapse following the end of the second measurement window; or
the base station receives the CSI, reported by the user equipment, measured in the second measurement window over a PUSCH resource in the M-th sub-frame following the end of the second measurement window; or
the base station receives the CSI, reported by the user equipment, measured in the second measurement window over the latest PUCCH resource after M sub-frames elapse since the trigger signaling is transmitted; or
the base station receives the CSI, reported by the user equipment, measured in the second measurement window over a PUSCH resource in the M-th sub-frame after the trigger signaling is transmitted.

12. A device for feeding back channel state information, the device comprising:
a processor, a memory, a receiver and a transmitter;
wherein the transmitter is controlled by the processor to transmit data, the receiver is controlled by the processor to receive data, the memory stores preset program, and the processor reads the program in the memory, and to execute the program:
to receive a trigger signaling transmitted by a base station, wherein the trigger signaling indicates the device to report Channel State Information (CSI) obtained in a specified measurement window; and
to report the CSI measured by the device in the measurement window to the base station;
wherein the processor:
reports CSI measured by the device in a first measurement window to the base station after M sub-frames elapse since the trigger signaling is received, wherein the first measurement window is a measurement window before the trigger signaling is received and closest to a sub-frame in which the trigger signaling is received, and M is an integer more than or equal to 0; or
reports CSI measured by the device in a second measurement window to the base station after M sub-frames elapse following the end of the second measurement window, wherein the second measurement window is a specified measurement window after the trigger signaling is received and closest to a sub-frame in which the trigger signaling is received, and M is an integer more than or equal to 0; or
reports CSI measured by the device in a second measurement window to the base station after M sub-frames elapse since the trigger signaling is received, wherein the second measurement window is a specified measurement window after the trigger signaling is received and closest to a sub-frame in which the trigger signaling is received, and M is an integer more than or equal to 0.

13. The device according to claim 12, wherein the processor:
reports the CSI measured by the device in the first measurement window to the base station over the latest PUCCH resource after M sub-frames elapse since the receiving module receives the trigger signaling; or to report the CSI measured by the device in the first measurement window to the base station over a PUSCH resource in the M-th sub-frame after the receiving module receives the trigger signaling.

14. The device according to claim 12, wherein the processor:

reports the CSI measured by the device in the second measurement window to the base station over the latest PUCCH resource after M sub-frames elapse following the end of the second measurement window; or reports the CSI measured by the device in the second measurement window to the base station over a PUSCH resource in the M-th sub-frame following the end of the second measurement window; or reports the CSI measured by the device in the second measurement window to the base station over the latest PUCCH resource after M sub-frames elapse since the receiving module receives the trigger signaling; or reports the CSI measured by the device in the second measurement window to the base station over a PUSCH resource in the M-th sub-frame after the receiving module receives the trigger signaling.

\* \* \* \* \*